(12) United States Patent
Jan et al.

(10) Patent No.: US 7,670,077 B2
(45) Date of Patent: Mar. 2, 2010

(54) ROTATABLE JOINT AND CONNECTING DEVICE USED FOR THE SAME

(75) Inventors: Te-Sheng Jan, Taipei Hsien (TW);
Yu-Tao Chen, Taipei Hsien (TW);
Chun-Che Yen, Taipei Hsien (TW);
Zheng-Qiang Song, Shenzhen (CN);
Jian-Jun Li, Shenzhen (CN); Bing-Jing Xu, Shenzhen (CN); Meng-Hua He, Shenzhen (CN); Gang Cheng, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 68 days.

(21) Appl. No.: 11/960,746

(22) Filed: Dec. 20, 2007

(65) Prior Publication Data

US 2009/0060639 A1 Mar. 5, 2009

(30) Foreign Application Priority Data

Aug. 31, 2007 (CN) .......................... 2007 1 0201550

(51) Int. Cl.
*F16C 11/06* (2006.01)

(52) U.S. Cl. .............................. 403/90; 403/53; 403/62; 403/93; 403/97; 403/165; 285/262

(58) Field of Classification Search .................... 403/53, 403/57, 62, 85, 88, 90, 93, 94, 95, 96, 97, 403/122, 141, 142, 143, 150, 163, 165; 285/262, 285/266; 74/490.05, 490.06; 901/28, 29
See application file for complete search history.

(56) References Cited

U.S. PATENT DOCUMENTS

| 840,825 | A | * | 1/1907 | Hawley | 432/262 |
|---|---|---|---|---|---|
| 1,153,789 | A | * | 9/1915 | Hopkins | 403/122 |
| 5,626,433 | A | * | 5/1997 | Iwamoto | 403/76 |
| 5,628,577 | A | * | 5/1997 | Ribeiro et al. | 403/150 |
| 6,550,138 | B2 | * | 4/2003 | Billimack et al. | 403/150 |
| 6,802,328 | B2 | * | 10/2004 | Lin | 403/53 |
| 7,226,234 | B2 | * | 6/2007 | Gordy et al. | 403/344 |

FOREIGN PATENT DOCUMENTS

| CN | 1082451 A | 2/1994 |
|---|---|---|
| CN | 1111732 A | 11/1995 |
| CN | 2595424 Y | 12/2003 |
| JP | 2002227829 A | 8/2002 |

* cited by examiner

*Primary Examiner*—Michael P Ferguson
(74) *Attorney, Agent, or Firm*—Frank R. Niranjan

(57) ABSTRACT

An exemplary rotatable joint (100) includes a socket (10), a rotatable arm (20), and a connecting device (30) configured for being mounted in the socket. The connecting device includes a sub-socket (31), two elastic sleeves (33), and two pivot shafts (35) fixed to the socket. The sub-socket includes a first half (311) and a second half (312). A pivot hole (315, 316) is defined in each of the first half and the second half for engaging with an outer surface (331) of one of the elastic sleeves. An outer surface (351) of each of the pivot shafts engages with an inner surface (332) of one of the elastic sleeves. A through hole (317) is defined in the sub-socket for rotatably engaging with the rotatable arm. Each of the elastic sleeves abuts the rotatable arm.

15 Claims, 5 Drawing Sheets

ROTATABLE JOINT AND CONNECTING DEVICE USED FOR THE SAME

BACKGROUND OF THE INVENTION

1. Field of the Invention

The present invention generally relates to joints and connecting devices used for the joints, and more particularly, to a rotatable joint and a connecting device used for the rotatable joint.

2. Discussion of the Related Art

Rotatable joints afford movement for arms of mechanical devices. As such, a mechanical device, having an arm designed for movement, includes a rotatable joint. The rotatable joint may join an arm or an actuating portion to a supporting portion (generally the body) of the mechanical device. In other words, the actuating portion is attached to the supporting portion by the rotatable joint. A typical actuating portion includes a base fixed to the supporting portion, a movable member fixed to the actuating portion, and a pivot shaft for connecting the base and the movable member. A pivot hole is defined in the base, and one end of the pivot shaft rotatably engages in the pivot hole. The other end of the pivot shaft is rotatably connected to the movable member by a pin. Thus, the movable member not only can rotate together with the pivot shaft relative to the base, but can also rotate relative to the pivot shaft.

Due to friction, wear and tear of usage, the pivot shaft and the pin of the rotatable joint may become worn out, thus the rotatable joint may become unstable and control of the actuating portion may suffer.

Therefore, a new rotatable joint that is less likely to be worn out, and to be stable over the long term, is desired.

SUMMARY

In one aspect, a rotatable joint includes a socket, a rotatable arm, and a connecting device configured for being mounted in the socket. The connecting device includes a sub-socket, two elastic sleeves, and two pivot shafts fixed to the socket. The sub-socket includes a first half and a second half. A pivot hole is defined in each of the first half and the second half for engaging with an outer surface of one of the elastic sleeves. An outer surface of each of the pivot shafts engages with an inner surface of one of the elastic sleeves. A through hole is defined in the sub-socket for rotatably engaging with the rotatable arm. Each of the elastic sleeves abuts the rotatable arm.

In another aspect, a rotatable connecting device, used for a rotatable joint having a socket and a rotatable arm, includes a sub-socket, an elastic sleeve, and a pivot shaft for being fixed to the socket. A pivot hole is defined in the sub-socket for engaging with an outer surface of the elastic sleeve. An outer surface of the pivot shaft engages with an inner surface of the elastic sleeve. A through hole is defined in the sub-socket for rotatably engaging with the rotatable arm.

Other advantages and novel features will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of the present rotatable joint (and the connecting device used for the rotatable joint). Moreover, in the drawings, like reference numerals designate corresponding parts throughout the several views, and all the views are schematic.

DETAILED DESCRIPTION OF THE EMBODIMENTS

Reference will now be made to the drawings to describe preferred embodiments of the present rotatable joint and the connecting device used for the rotatable joint in detail.

Figure 1:
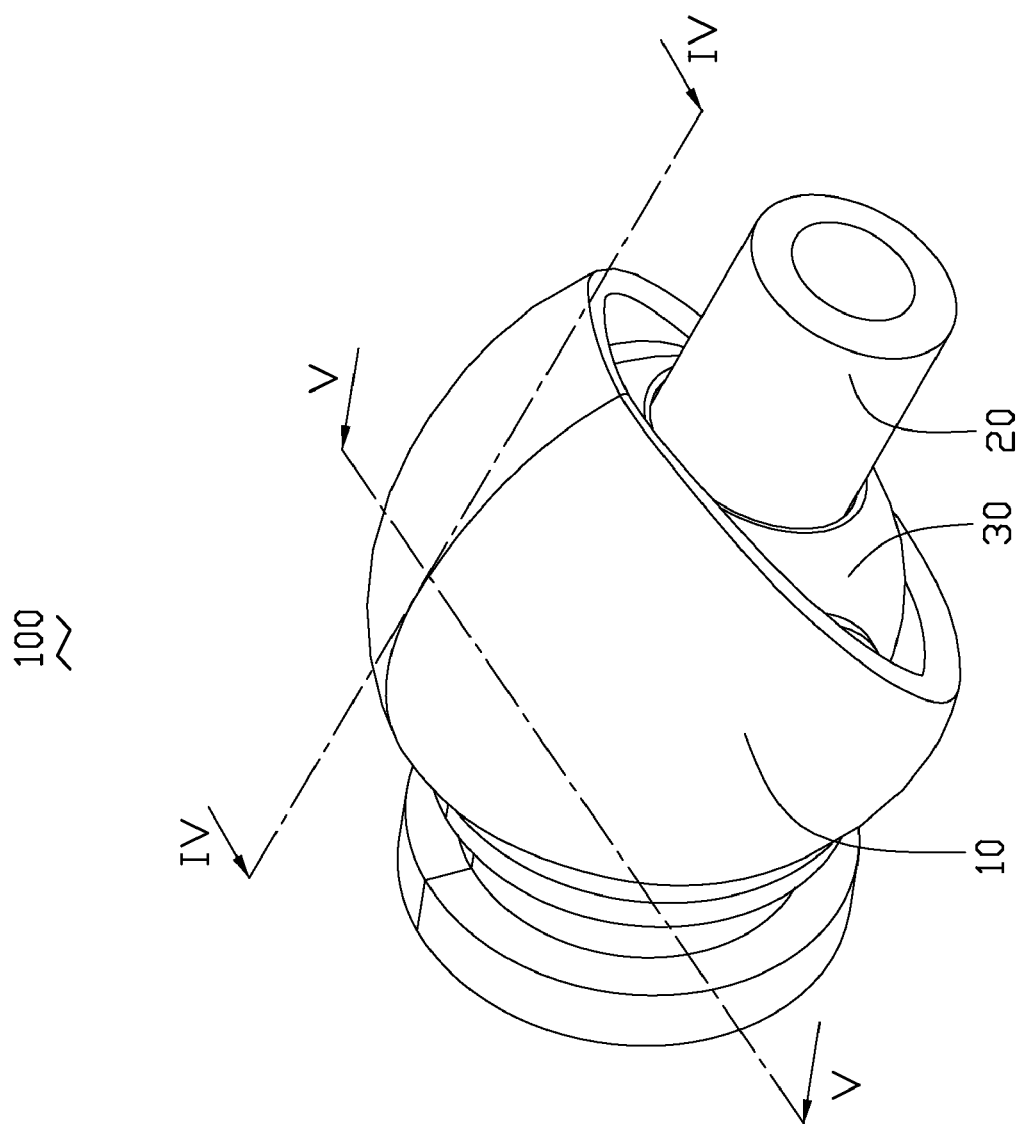
FIG. 1 is an assembled view of a rotatable joint in accordance with a preferred embodiment of the present invention.

Referring to FIG. 1, a rotatable joint 100 for a mechanical device in accordance with a preferred embodiment is shown. The rotatable joint 100 includes a socket 10, a rotatable arm 20, and a connecting device 30. The connecting device 30 is mounted in the socket 10, and the rotatable arm 20 is rotatably attached to the connecting device 30.

Figure 2:
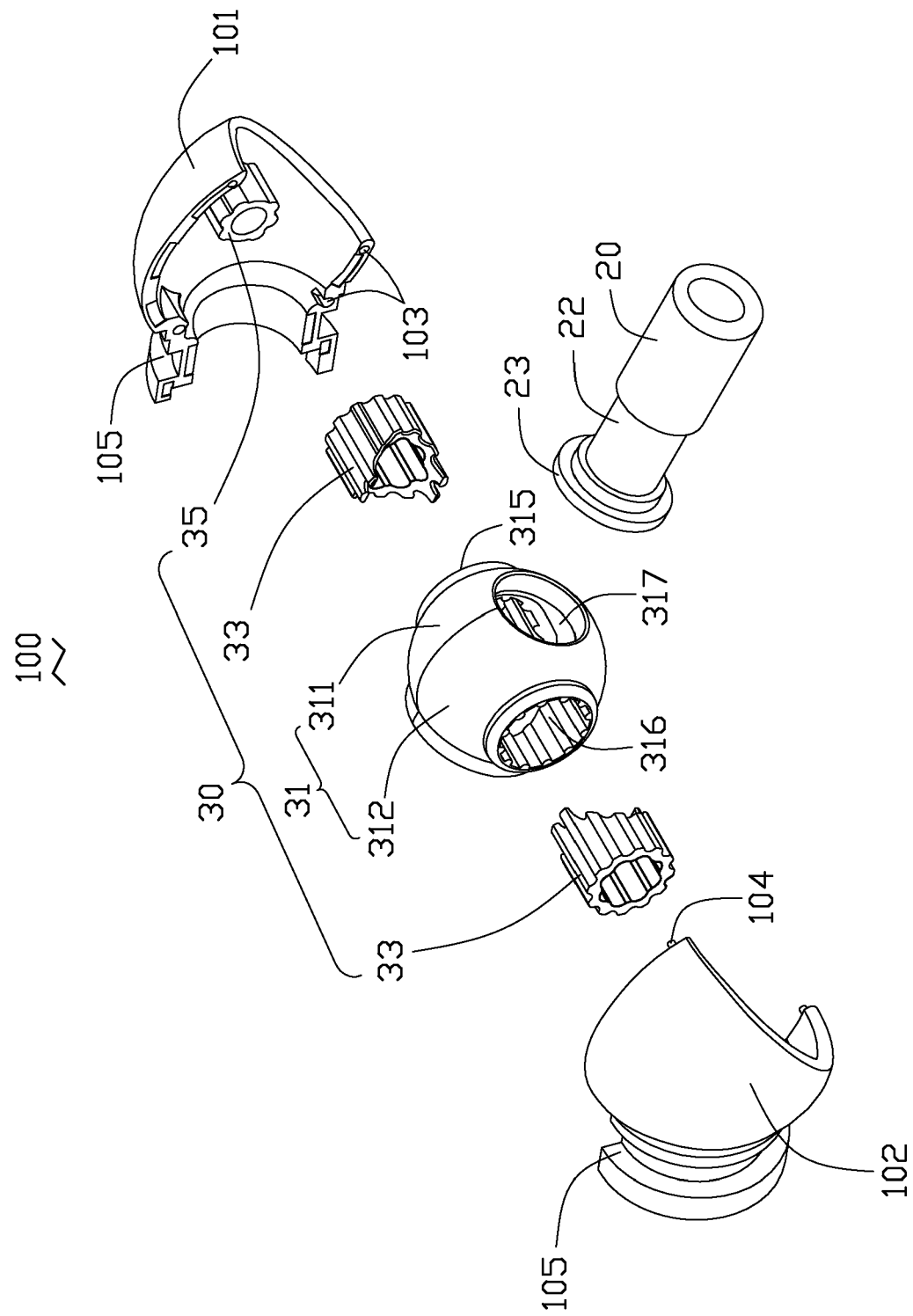
FIG. 2 is an exploded, isometric view of the joint shown in FIG. 1.

Referring to FIG. 2 together with FIG. 1, the socket 10 is substantially a hollow spheroid with an opening defined therein. The socket 10 includes a first half socket 101 and a second half socket 102 that collectively form the socket 10. A plurality of latching holes 103 are defined in an end surface of the first half socket 101 and a plurality of latching pins 104 are formed on an end surface of the second half socket 102. Each of the latching pins 104 corresponds to one of the latching holes 103. The latching pins 104 are configured to tightly fitted into the latching holes 103, thus, holding the first half socket 101 and the second half socket 102 together. The socket 10 further includes a fixing portion 105 extending from the first half socket 101 and the second half socket 102 correspondingly. The fixing portion 105 is configured to fix the socket 10 to a supporting portion of the mechanical device.

The rotatable arm 20 is substantially a cylindrical shaft. The rotatable arm 20 includes an engaging groove 22 defined therein and a flange 23 disposed at an end adjacent to the engaging groove 22. Another end of the rotatable arm 20 opposite to the flange 23 is configured for fixing the rotatable arm 20 to an actuating portion of the mechanical device.

Figure 3:
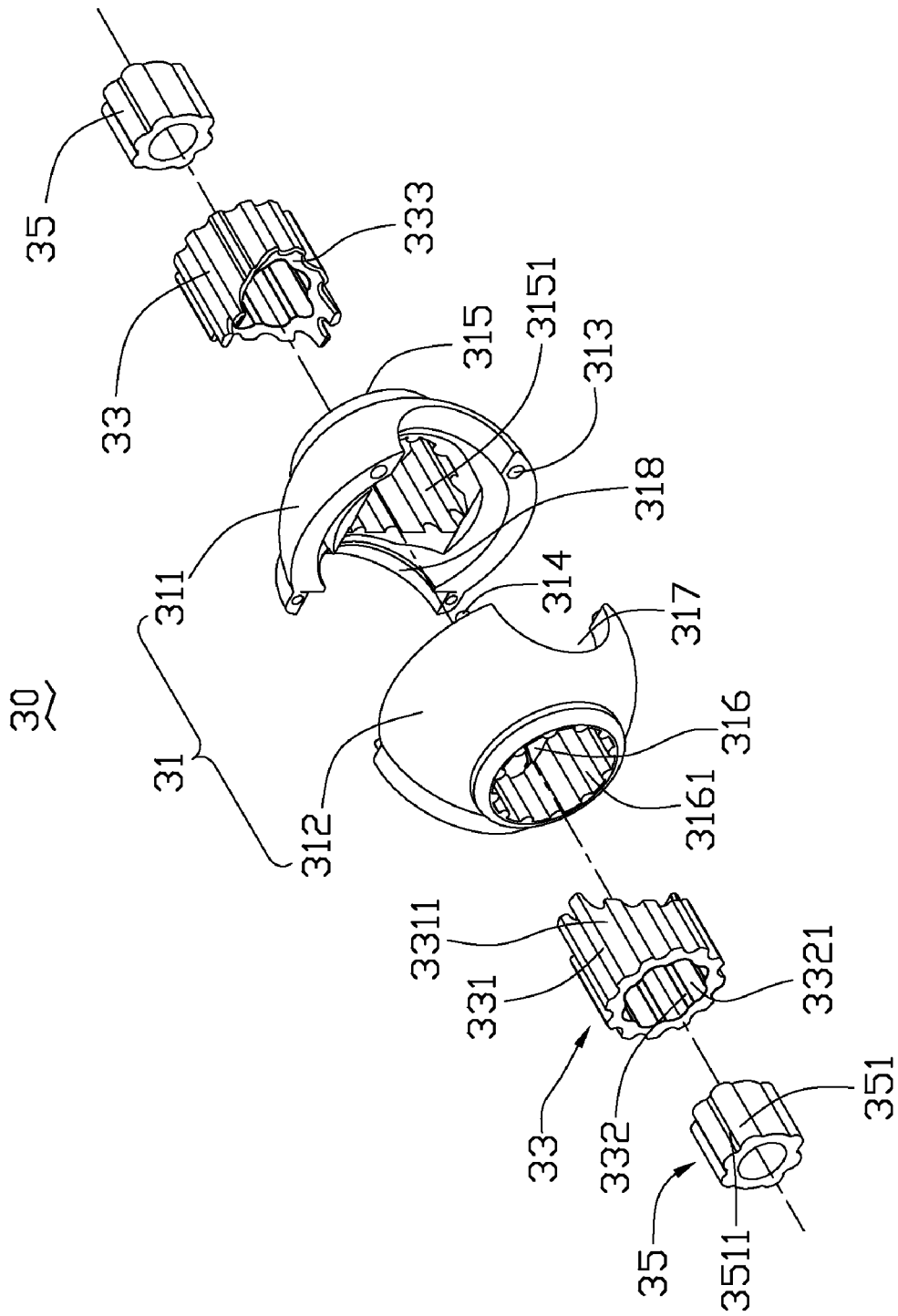
FIG. 3 is an exploded view of a connecting device used for the rotatable joint shown in FIG. 1.

Referring to FIG. 3, the connecting device 30 includes a sub-socket 31, two elastic sleeves 33, and two pivot shafts 35.

The sub-socket 31 is substantially a hollow spheroid. The sub-socket 31 includes a first half 311 and a second half 312 that collectively form the sub-socket 31. The first half 311 and the second half 312 are substantially hemispheres. A plurality of latching holes 313 are defined in an end surface of the first half 311 and a plurality of latching pins 314 are formed on an end surface of the second half 312. Each of the latching pins 314 corresponds to one the latching holes 313. The latching pins 314 are configured to tightly fitted into the latching holes 313, thus, holding the first half 311 and the second half 312 together. The first half 311 includes a pivot hole 315 defined through a middle portion of the first half 311 and the second half 312 also includes a pivot hole 316 defined through a middle portion of the second half 312 according to the pivot hole 315. When the second half 312 is attached to the first half 311, the pivot hole 315 of the first half 311 and the pivot hole 316 of the second half 312 are aligned along a same axis. A plurality of parallelly aligned elongated grooves 3151, 3161 are defined in an inner surface of each of the pivot holes 315, 316. A through hole 317 is defined in the sub-socket 31. An imaginary line parallel to and through the longitudinal direction of the through hole 317 is perpendicular to an imaginary line parallel to and through the longitudinal direction of the pivot holes 315, 316. A stepped depression 318 is defined in a portion adjacent to one end of the through hole 317 of the sub-socket 31 for engaging with the flange 23 of the rotatable arm 20.

The elastic sleeves 33 are made of plastic materials, and in this embodiment, the elastic sleeves 33 are preferred to be made of silicone. Each of the elastic sleeves 33 includes an outer surface 331 and an inner surface 332. A plurality of parallel elongated grooves 3311 are defined in the outer surface 331 of each elastic sleeve 33 and a plurality of parallelly aligned elongated grooves 3321 are defined in the inner surface 332 of each elastic sleeve 33. The outer surfaces 331 of the elastic sleeves 33 engage with the pivot holes 315, 316 of the sub-socket 31 correspondingly, thereby defining a plurality of positioning points in different positions for retaining the sub-socket 31. Each of the elastic sleeves 33 includes a concave portion 333 defined therein for engaging with the engaging groove 22 of the rotatable arm 20.

Each of the pivot shafts 35 includes an outer surface 351. A plurality of parallelly aligned elongated grooves 3511 are defined in the outer surface 351 of each of the pivot shafts 35. The outer surfaces 351 of the pivot shafts 35 engage with the inner surfaces 332 of the elastic sleeves 33, thereby defining a plurality of positioning points in different positions. The pivot shaft 35 is configured for being fixed to the socket 10 by welding, or adhesive substances. The pivot shaft 35 can also be integrally made with the socket 10.

In alternative embodiments. A plurality of parallelly aligned elongated grooves are defined in either the inner surface 332 of the elastic sleeve 33 or the outer surface 351 of the pivot shaft 35. Another of either the inner surface 332 or the outer surface 351 without elongated grooves defines an elongated rib. The elongated rib is configured for engaging in the elongated grooves, thereby defining a plurality of positioning points in different positions. Similarly, a plurality of parallelly aligned elongated grooves are defined either in the outer surface 331 of the elastic sleeve 33 or in the inner surface of each of the pivot holes 315, 316. Another of either the outer surface 331 or the inner surface of each of the pivot holes 315, 316 without elongated grooves defines an elongated rib. The elongated rib is configured for engaging with the elongated grooves of the outer surface 331 of the elastic sleeve 33 or the inner surface of the pivot hole 315, 316, thereby defining a plurality of positioning points in different positions.

Figure 4:
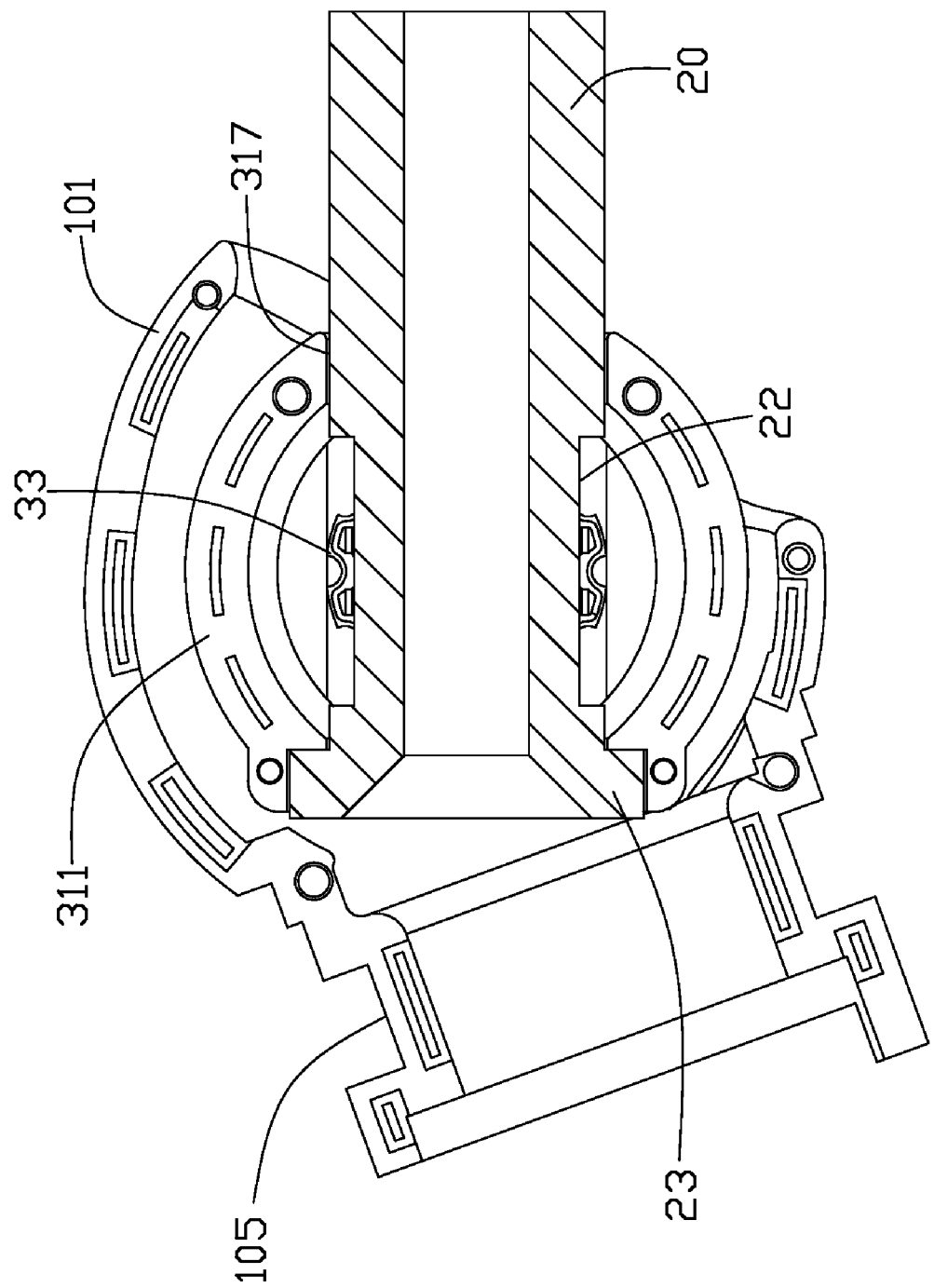
FIG. 4 is an enlarged, cross-sectional view of the joint shown in FIG. 1, taken along the line IV-IV thereof.
Figure 5:
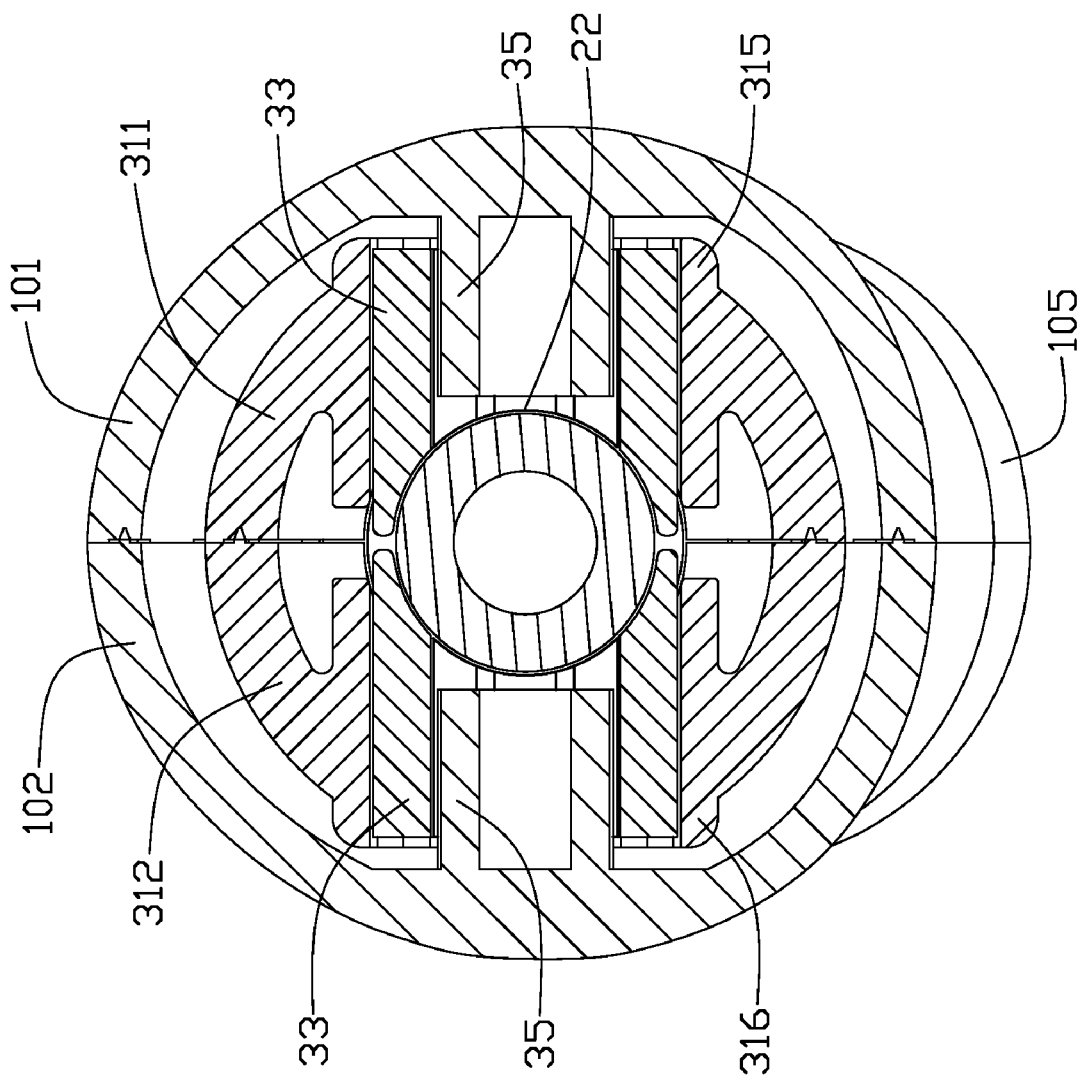
FIG. 5 is an enlarged, cross-sectional view of the joint shown in FIG. 1, taken along the line V-V thereof.

Referring to FIGS. 4 and 5, in assembly, the rotatable arm 20 is positioned between the first half 311 and the second half 312. The rotatable arm 20 engages in the through hole 317 of the sub-socket 31 of the connecting device 30, and the flange 23 of the rotatable arm 20 engages in the stepped depression 318 adjacent to one end of the through hole 317, thus blocking the arm from sliding out of the through hole 317. The second half 312 is attached to the first half 311 by inserting the latching pins 314 in the latching holes 313. The elastic sleeves 33 are correspondingly received in pivot holes 315, 316 with the concave portions 333 engaging in the engaging groove 22 of the rotatable arm 20 correspondingly. One of the pivot shafts 35 is fixed in the first half socket 101 of the socket 10 and the other pivot shaft 35 is fixed in the second half socket 102. The pivot shafts 35 are also correspondingly received in the elastic sleeves 33. The second half socket 102 is attached to the first half socket 101 by inserting the latching pins 104 into the latching holes 103.

In use, when an external force is applied to the rotatable arm 20, the rotatable arm 20 can be rotated together with the sub-socket 31 along an axis of the pivot shaft 35. The outer surfaces 331 of the elastic sleeves 33 and the sub-socket 31 produce friction, and the inner surfaces 332 of the elastic sleeves 33 and the outer surfaces 351 of the pivot shafts 35 also produce friction. The rotatable arm 20 can be retained in any one of the positioning points by the friction. The rotatable arm 20 can also be rotated along an axis perpendicular to the axis of the pivot shaft 35. The rotatable arm 20 is able to be retained in any position because of friction produced between the concave portions 333 of the elastic sleeves 33 and concave portions 333 of the elastic sleeves 33.

When the fixing portion 105 of the socket 10 is fixed to a supporting portion of the mechanical device, and the rotatable arm 20 is fixed to an actuating portion of the mechanical device, the actuating portion can be rotated along two directions. Therefore, the mechanical device can obtain different stable using states. In addition, the socket 10 and the sub-socket 31 are easy to assemble by inserting the latching pins 103, 104 into the latching holes 104, 313.

In an alternative embodiment, the connecting device 30 can includes only one pivot shaft 35 and only one elastic sleeve 33. Accordingly, only one through hole is defined in the sub-socket 31 for receiving the pivot shaft 35.

It should be understood that, the fixing portion 105 of the socket 10 can also be fixed to the actuating portion of the mechanical device, and the rotatable arm 20 can also be fixed to the supporting portion of the mechanical device. The fixing portion 105 of the socket 10 can also be integrally made with the supporting portion of the mechanical device, and the rotatable arm 20 can also be integrally made with the actuating portion of the mechanical device. The rotatable joint 100 is not limited to be used for mechanical devices, it can also be used for connecting an actuating portion and a supporting portion of other similar devices.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A rotatable joint, comprising:
   a socket comprising a first half socket and a second half socket collectively forming the socket;
   a rotatable arm comprising a cylinder with an annular engaging groove defined therein; and
   a connecting device mounted in the socket, the connecting device including a sub-socket, two elastic sleeves, and two pivot shafts, the sub-socket including a first half rotatably received in the first half socket and a second half rotatably received in the second half socket, each of the first half and the second half defining a pivot hole therein for engaging with an outer surface of one of the elastic sleeves, the pivot shafts respectively fixed in the first and second half sockets, an outer surface of each of the pivot shafts engaging with an inner surface of one of the elastic sleeves, the sub-socket defining a through hole therein for rotatably engaging with the rotatable arm, and each of the elastic sleeves comprising a concave portion rotatably received in the engaging groove of the rotatable arm;

wherein each of the pivot holes includes an inner surface with a plurality of parallelly aligned elongated grooves defined therein, a plurality of parallelly aligned elongated ribs are formed on the outer surface of each elastic sleeve to engage in the elongated grooves of the inner surface of each pivot hole in a fixed pivot position; a plurality of parallelly aligned elongated grooves are defined in the inner surface of each elastic sleeve, and a plurality of parallelly aligned elongated ribs are formed on the outer surface of each pivot shaft to engage in the elongated grooves of each elastic sleeve in the fixed pivot position, the elastic sleeves resiliently deforming to allow the sub-socket to pivot relative to the pivot shaft.

2. The rotatable joint as claimed in claim 1, wherein the first half and the second half of the sub-socket are substantially hemispheres.

3. The rotatable joint as claimed in claim 1, wherein the first half of the sub-socket includes a plurality of latching holes defined in an end surface thereof, the second half comprises a plurality of latching pins formed on an end surface thereof, and the second half of the sub-socket the is attached to the first half of the sub-socket by inserting the latching pins in the latching holes.

4. The rotatable joint as claimed in claim 1, wherein the pivot hole of the first half and the pivot hole of the second half are aligned along a same axis.

5. The rotatable joint as claimed in claim 1, wherein the rotatable arm comprises a flange at one end adjacent to the engaging groove, a stepped depression is defined in a portion adjacent to one end of the through hole of the sub-socket, and the flange of the rotatable arm engages in the stepped depression of the sub-socket.

6. The rotatable joint as claimed in claim 1, wherein the elastic sleeves are made of plastic materials.

7. The rotatable joint as claimed in claim 1, wherein the elastic sleeves are made of silicone.

8. The rotatable joint as claimed in claim 1, wherein an imaginary line parallel to and through the longitudinal direction of the through hole is perpendicular an imaginary line parallel to and through the longitudinal direction of to the pivot holes.

9. A rotatable joint used for a mechanical device, comprising:
  a socket;
  a rotatable arm comprising a cylinder with an annular engaging groove defined therein; and
  a connecting device including a sub-socket rotatably received in the socket, an elastic sleeve, and a pivot shaft fixed to the socket, a pivot hole defined in the sub-socket for engaging with an outer surface of the elastic sleeve, an outer surface of the pivot shaft engaging with an inner surface of the elastic sleeve, a through hole defined in the sub-socket for rotatably engaging with the rotatable arm, and the elastic sleeve comprising a concave portion rotatably received in the engaging groove of the rotatable arm;
  wherein the pivot hole includes an inner surface with a plurality of parallelly aligned elongated grooves defined therein, a plurality of parallelly aligned elongated ribs are formed on the outer surface of the elastic sleeve to engage in the elongated grooves of the inner surface of the pivot hole in a fixed pivot position; a plurality of parallelly aligned elongated grooves are defined in the inner surface of the elastic sleeve, and a plurality of parallelly aligned elongated ribs are formed on the outer surface of the pivot shaft to engage in the elongated grooves of the elastic sleeve in the fixed pivot position, the elastic sleeves resiliently deforming to allow the sub-socket to pivot relative to the pivot shafts.

10. The rotatable joint as claimed in claim 9, wherein the sub-socket includes a first half and a second half, the first half of the sub-socket includes a plurality of latching holes defined in an end surface thereof and the second half of the sub-socket includes a plurality of latching pins formed on an end surface thereof, the second half of the sub-socket is attached to the first half by inserting the latching pins in the latching holes.

11. The rotatable joint as claimed in claim 9, wherein the rotatable arm comprises a flange at one end adjacent to the engaging groove, a stepped depression is defined in a portion adjacent to one end of the through hole of the sub-socket, and the flange of the rotatable arm engages in the stepped depression of the sub-socket.

12. The rotatable joint as claimed in claim 9, wherein the socket is substantially a hollow spheroid including a first half socket and a second half socket, the first half socket includes a plurality of latching holes defined in an end surface thereof, the second half socket includes a plurality of latching pins formed on an end surface thereof, and the second half socket is attached to the first half socket by inserting the latching pins in the latching holes.

13. The rotatable joint as claimed in claim 9, wherein the elastic sleeve is made of silicone.

14. A connecting device, used for a joint having a socket and a rotatable arm, comprising:
  a sub-socket for being rotatably received in the socket;
  an elastic sleeve the elastic sleeve comprising a concave portion for being rotatably received in an engaging groove of the rotatable arm; and
  a pivot shaft for being fixed to the socket;
  wherein the sub-socket includes a pivot hole defined therein for engaging with an outer surface of the elastic sleeve, an outer surface of the pivot shaft engages with an inner surface of the elastic sleeve, and a through hole defined in the sub-socket for rotatably engaging with the rotatable arm;
  wherein the pivot hole includes an inner surface with a plurality of parallelly aligned elongated grooves defined therein, a plurality of parallelly aligned elongated ribs are formed on the outer surface of the elastic sleeve to engage in the elongated grooves of the inner surface of the pivot hole in a fixed pivot position; a plurality of parallelly aligned elongated grooves are defined in the inner surface of the elastic sleeve, and a plurality of parallelly aligned elongated ribs are formed on the outer surface of the pivot shaft to engage in the elongated grooves of the elastic sleeve in the fixed pivot position, the elastic sleeve resiliently deforming to allow the sub-socket to pivot relative to the pivot shaft.

15. The connecting device as claimed in claim 14, wherein the sub-socket includes a first half and a second half, the first half of the sub-socket includes an end surface with a plurality of latching holes defined therein and the second half includes a plurality of latching pins formed on an end surface thereof, the second half of the sub-socket is attached to the first half of the sub-socket by inserting the latching pins in the latching holes.

* * * * *